(12) United States Patent
Ferriere (10) Patent No.: US 6,278,478 B1
(45) Date of Patent: Aug. 21, 2001

(54) END-TO-END NETWORK ENCODING ARCHITECTURE

(75) Inventor: Philippe Ferriere, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/383,449

(22) Filed: Aug. 26, 1999

Related U.S. Application Data
(60) Provisional application No. 60/125,014, filed on Mar. 18, 1999.

(51) Int. Cl.[7] .................................... H04N 7/14
(52) U.S. Cl. ................. 348/14.1; 348/14.08; 348/14.12
(58) Field of Search ................. 348/14, 15, 16, 348/17; 370/260, 261, 263, 264, 265, 352, 389, 400; 709/204, 205; 375/240.02, 240.05, 240.07

(56) References Cited

U.S. PATENT DOCUMENTS

| | | | |
|---|---|---|---|
| 5,389,965 | * | 2/1995 | Kuzma ................................. 348/17 |
| 5,889,549 | * | 3/1999 | Yasuda et al. .................... 348/14.01 |
| 5,898,457 | * | 4/1999 | Nagao et al. ...................... 348/14.1 |
| 5,963,547 | * | 10/1999 | O'Neil et al. ......................... 348/15 |
| 5,974,375 | * | 10/1999 | Aoyagi et al. ....................... 704/216 |
| 6,014,432 | * | 1/2000 | Modney ................................. 348/17 |

* cited by examiner

*Primary Examiner*—Curtis Kuntz
*Assistant Examiner*—Melur Ramakrishnaiah
(74) *Attorney, Agent, or Firm*—Leydig, Voit & Mayer, Ltd.

(57) ABSTRACT

An improved teleconferencing data capture, encoding, and decoding architecture incorporates the audio encoding and video encoding functions in capture encoder hardware devices, and incorporates the video decoding function in a video decoder hardware device. The video decoder and an audio decoder are able to analyze incoming data packets and are communicably linked to their respective capture encoder devices, or to a single capture encoder device if both audio and video capture and encoding functions are incorporated in a single device, so that the capture and/or encoding functions may be modified during the course of a teleconference.

13 Claims, 8 Drawing Sheets

END-TO-END NETWORK ENCODING ARCHITECTURE

CROSS-REFERENCE TO RELATED APPLICATION

This application claims the benefit of U.S. Provisional Application Ser. No. 60/125,014 filed Mar. 18, 1999.

TECHNICAL FIELD

This invention relates generally to audio video teleconferencing between two or more remote parties and, more particularly, relates to a novel hardware acceleration architecture which provides improved audio and video data encoding, decoding, and transmission performance.

BACKGROUND OF THE INVENTION

Video teleconferencing generally involves a meeting between remote parties, whereby each remote party is able to see and hear at least one other remote party. This generally requires the rapid transmission of synchronized audio and video data. Typically, the data that is to be transmitted is first captured and encoded by a sending computer, and then communicated via an electronic data channel to a receiving computer, where the data is received, decoded, and rendered or otherwise manifested to the receiving conference party. Existing schemes for carrying out the aforementioned steps include a hardware device to capture the information to be sent and a separate software encoder to encode the information. Typically, the capture hardware itself is not network aware, and cannot responsively tailor its processing or output to the needs of the receiving computer. Additionally, the encoder is typically a software module running on the host computer, consuming host memory and processor time. At the remote receiving location, the decoder is typically "dumb," in the sense that it does not interpret or analyze the data stream, but merely performs a decoding function. Additionally, as with the typical encoder, the typical decoder is implemented as a software module running on the host.

This existing system of exchanging audio and video teleconferencing data gives rise to many inefficiencies. During a video teleconference, the computational resources of a computer are often fully utilized, and occasionally exhausted, while the resources of the sending capture device or the receiving video data processor are typically underutilized. This inefficient allocation of computing resources sometimes leads to deterioration or loss of the video or audio data being transmitted. Additionally, the output of the capture device must sometimes be further processed prior to encoding, causing further inefficiencies. Finally, because existing capture devices are not able to directly access communication channels to their counterparts at a remote location during a teleconference in order to optimize the encoding/decoding process, data transmission is often of less than optimal quality and accuracy.

A system implementing the invention preferably conforms to the appropriate International Telecommunications Union (ITU) standards for multimedia communications over packet-based networks. In particular, the Telecommunications Standardization Sector of the ITU (ITU-T) has published a set of standards under the H.323 designation which include standards for data channels, monitoring channels, and control channels. According to the H.323 group of standards, audio and video data streams to be transmitted are encoded (compressed) and packetized in conformance with a real-time transport protocol (RTP) standard. The packets thus generated include both data and header information. The header information includes information whereby synchronization, loss detection, and status detection are facilitated. Within the H.323 recommendation, video applications may use the H.261, H.262, or H.263 protocols for data transmissions, while audio applications may use the G.711, G.722, G.723.1, G.728, or G.729 protocols. Any class of network which utilizes TCP/IP will generally support H.323 compliant teleconferencing. Examples of such networks include the Internet and many LANs.

An H.323 compliant terminal generally initiates and conducts a communications session via a gatekeeper. Accordingly, although a gatekeeper is not necessary, in a typical teleconference, there may reside a gatekeeper at each of the transmitting and receiving ends. The gatekeeper may perform address translation and bandwidth management, and may serve to map LAN aliases to IP addresses.

Additionally, in order to allow for the exchange of status information between the transmitter and receiver, a real-time transport control protocol (RTCP) channel is opened.

In order to provide control functions, an H.245 control channel is established. This channel supports the exchange of capability information, the opening and closing of data channels, and other control and indication functions.

Although the preferred embodiment will be described in the context of the Microsoft brand Windows Driver Model (WDM), one of skill in the art will appreciate that the invention is not limited to this implementation. The Windows Driver Model is a common set of services which allow the creation of drivers having compatibility between the Microsoft brand Windows 98 operating system and the Microsoft brand Windows 2000 operating system. Each WDM class abstracts many of the common details involved in controlling a class of similar devices. WDM utilizes a layered approach, implementing these common tasks within a WDM "class driver." Driver vendors may then supply smaller "minidriver" code entities to interface the hardware of interest to the WDM class driver.

WDM provides, among other functionalities, a Stream class driver to support kernel-mode streaming, allowing greater efficiency and reduced latency over user mode streaming. The stream architecture utilizes an interconnected filter organization, and employs the mechanism of "pins" to communicate to and from the filters, and to pass data. Both filters and pins are Component Object Model (COM) objects. The filter is a COM object that performs a specific task, such as transforming data, while a pin is a COM object created by the filter to represent a point of connection for a unidirectional data stream on the filter. Input pins accept data into the filter while output pins provide data to other filters. Filters and pins preferably expose control interfaces that other pins, filters, or applications can use to configure the behavior of those filters and pins. The interface "IBaseFilter" is an example of a filter configuration interface. An embodiment of the invention will be described by reference to the filters and pins of the WDM model hereinafter. For further information regarding the Windows Driver Model, please see *WDM Kernel Streaming Architecture*, available on the Internet at http://www.microsoft.com/Devonly/tech/hardware/desinit/csal.htm, or *Windows Driver Model (WDM) Technology*, available on the Internet at http://www.microsoft.com/Devonly/tech/hardware/WDM/default.htm.

Figure 6:
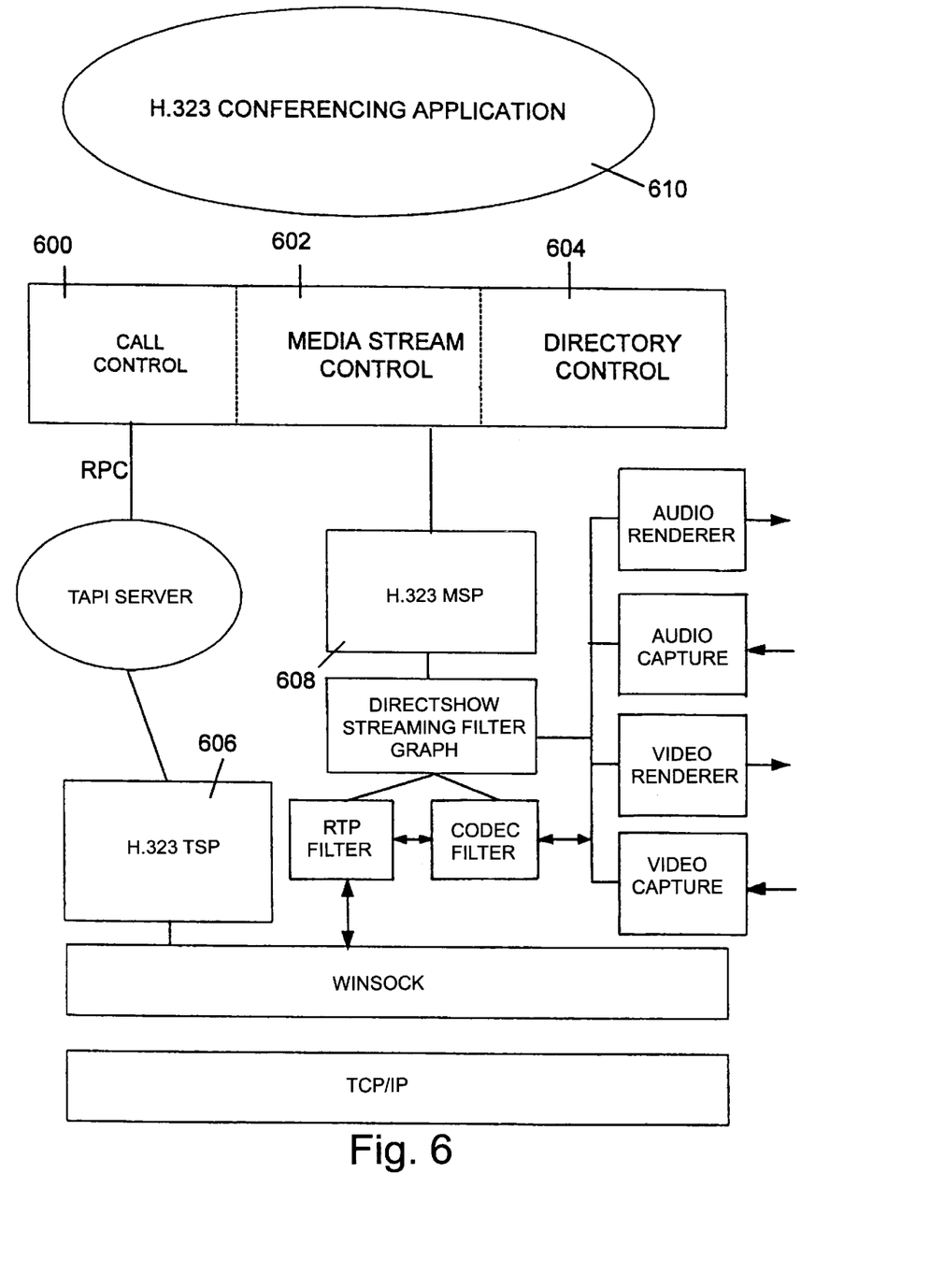
FIG. 6 is a diagram schematically illustrating the components of the TAPI 3.0 architecture usable to implement an embodiment of the invention.

As illustrated in FIG. 6, to control and access the kernel mode streaming data of the WDM architecture, a module such as Microsoft brand Telephony Application Programming Interface 3.0 (TAPI 3.0) running in user mode may be utilized by an application 610. The TAPI 3.0 COM API is implemented as a suite of COM objects, chiefly Call Control 600, Media Stream Control 602, and Directory Control 604. A Telephony Service Provider (TSP) 606 is responsible for resolving the protocol-independent call model of TAPI into protocol-specific call-control mechanisms, while a Media Stream Provider (MSP) 608 implements Microsoft brand DIRECTSHOW interfaces for a particular TSP. Microsoft brand DIRECTSHOW, part of the WDM, is an architecture which facilitates the control of multimedia data streams via modular components. TAPI 3.0 employs a kernel streaming proxy module such as KSProxy, a Microsoft DIRECTSHOW filter, to control and communicate with kernel mode filters. KSProxy provides a generic method of representing kernel mode streaming filters as DIRECTSHOW filters. Running in user mode, KSProxy accepts existing control interfaces and translates them into input/output control calls to the WDM streaming drivers. TAPI 3.0 may automatically create the WDM filter graph by invoking the appropriate filters and connecting the appropriate pins. For more information regarding TAPI 3.0, see *IP Telephony With TAPI 3.0*, available at http://msdn.microsoft.com/library/backgrnd/html/msdn_tapi_3.0.htm.

Figure 2A:
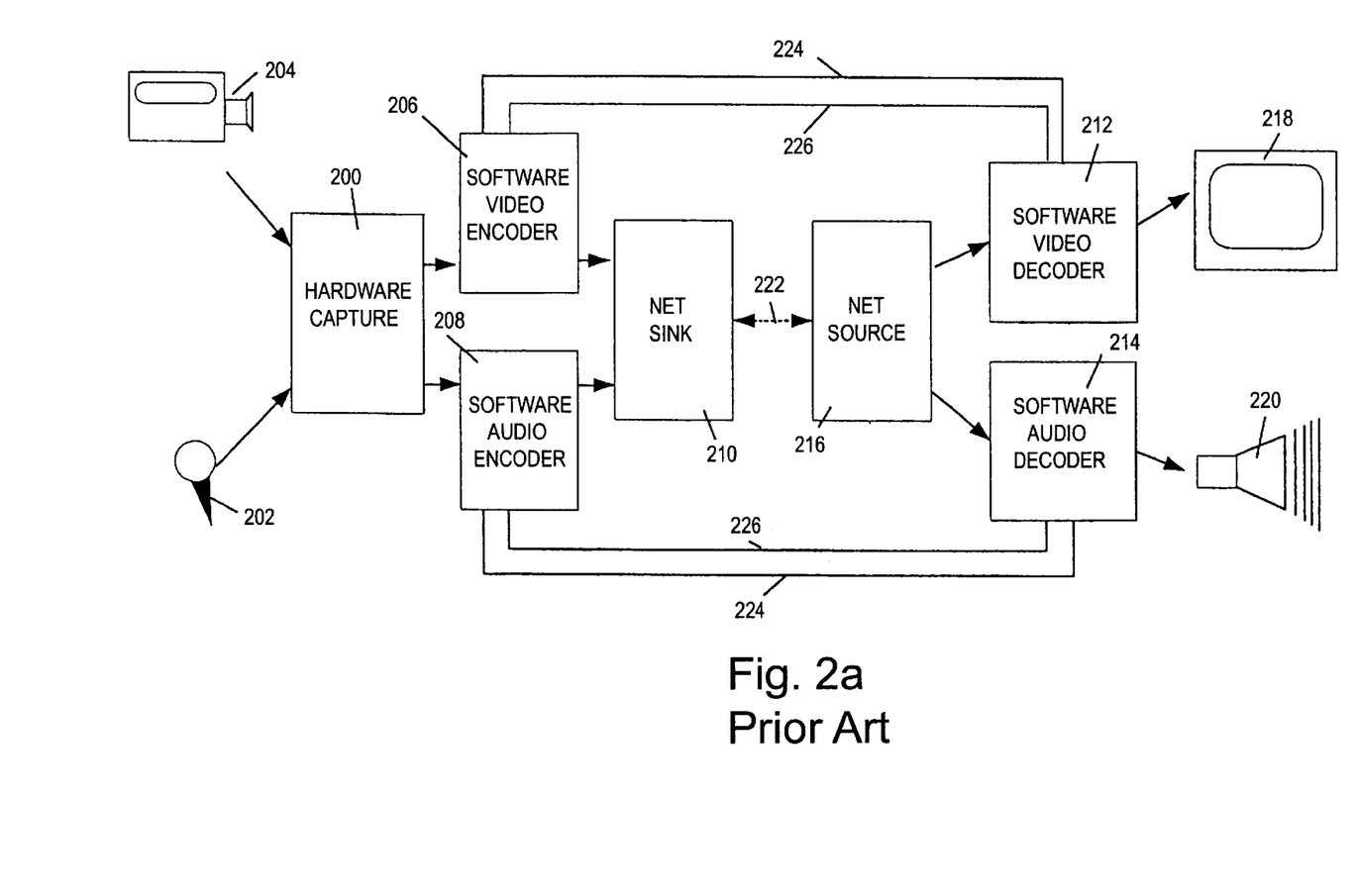
FIG. 2*a* is a block diagram schematically illustrating a prior art architecture for audio and video capture, encoding, and decoding.

FIG. 2*a* is a high-level schematic of a prior art teleconferencing architecture. According to the illustrated architecture, a capture device 200 receives input from a video or audio data source such as a microphone 202 or a video camera 204, and further processes the data, yielding PCM or RGB data respectively. Software video encoding 206 or audio encoding 208 modules receive the appropriate data and encode it into a form in which it can be transmitted by a network sink 210 over a data channel 222 to a remote endpoint.

At the remote endpoint, a software video decoder 212 or audio decoder 214 module receives the appropriate data from the network source 216. After decoding the encoded data, the software video decoder 212 or audio decoder 214 module outputs video or audio data respectively, usable by a video display device 218 or an audio speaker device 220. Typically, in addition to the data channel 222, there also exists a control channel 224 for exchanging capability information at the outset of the call, and a status channel 226 for passing status messages during the call. These channels link the encoder 206, 208 and decoder 212, 214, but typically do not pass to the capture device 200. One shortcoming of this architecture is that the capture function is not dynamically adaptable; the capture module 200 is not network aware, and the decoder modules 212, 214 are not capable of analyzing incoming data and responsively communicating with the capture module 200. A further draw back is that the computationally expensive encoding and decoding tasks are consuming critical resources of the host computers.

A method is needed whereby the computational resources of a hardware capture device and a hardware decoding device are utilized to perform certain encoding and decoding tasks currently allocated to the host computers in order to more efficiently process teleconference data. It is further desirable that the two functional units which are performing capture encoding and decoding at remote sites during a teleconference be communicably interconnected in order to facilitate more efficient and accurate data flow responsive to changing system capabilities and network conditions.

SUMMARY OF THE INVENTION

In order to provide efficient and accurate data encoding and decoding without straining the resources of the hosts, the invention allows for the performance of the audio encoding and video encoding steps within the capture hardware, and the performance of the video decoding steps in hardware as well. This preferably involves allocating the memory and computing resources of these hardware devices to the performance of the encoding and decoding functions, saving host resources.

Additionally, the invention provides for network awareness on the part of the encoder and decoder hardware by way of an intercommunication architecture between the sending and receiving computers. Consequently, the capture and encoding processes may be tailored to the needs and capabilities of the receiving decoder. This capability is preferably provided by a decoder that not only receives data, but that also functions to analyze what has been received, and that has access to a communications channel usable to communicate with the encoder hardware regarding missing, incomplete, or inaccurate data. To this end, control and monitoring channels are defined which allow the decoder to communicate capabilities and requirements to the encoder hardware, and to communicate information about the data stream to the encoder hardware. Application Programming Interfaces (API's) defined for the capture encoder and decoder hardware allow the capture encoder hardware to adapt its behavior in response to decoder commands and indications.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
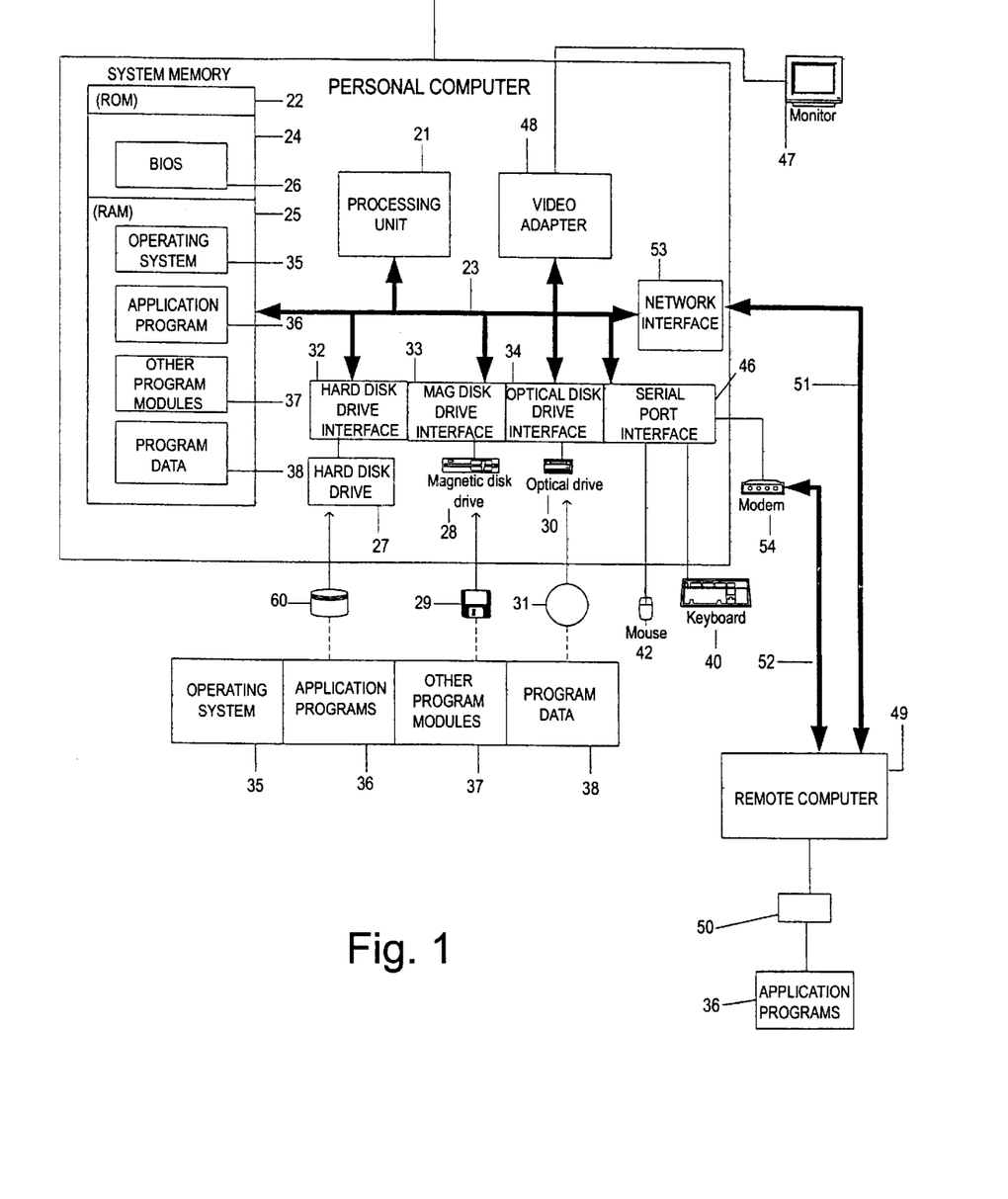
FIG. 1 is a block diagram generally illustrating an exemplary computer system on which the present invention resides.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB).

A monitor 47 or other type of display device is also connected to the system bus 23 via an interface, such as a video adapter 48. In addition to the monitor, personal computers typically include other peripheral output devices, not shown, such as speakers and printers.

The personal computer 20 operates in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in a remote memory storage device. It will be appreciated that the network connections shown are exemplary and other means of establishing a communications link between the computers may be used.

In the description that follows, the invention will be described with reference to acts and symbolic representations of operations that are performed by one or more computers or devices, unless indicated otherwise. As such, it will be understood that such acts and operations, which are at times referred to as being computer-executed, include the manipulation by the processing unit of the computer or device of electrical signals representing data in a structured form. This manipulation transforms the data or maintains it at locations in the memory system of the computer or device, which reconfigures or otherwise alters the operation of the computer or device in a manner well understood by those skilled in the art. The data structures where data is maintained are physical locations of memory that have particular properties defined by the format of the data. However, while the invention is being described in the foregoing context, it is not meant to be limiting as those of skill in the art will appreciate that various of the acts and operation described hereinafter as being implemented in software may also be implemented in hardware.

Figure 2B:
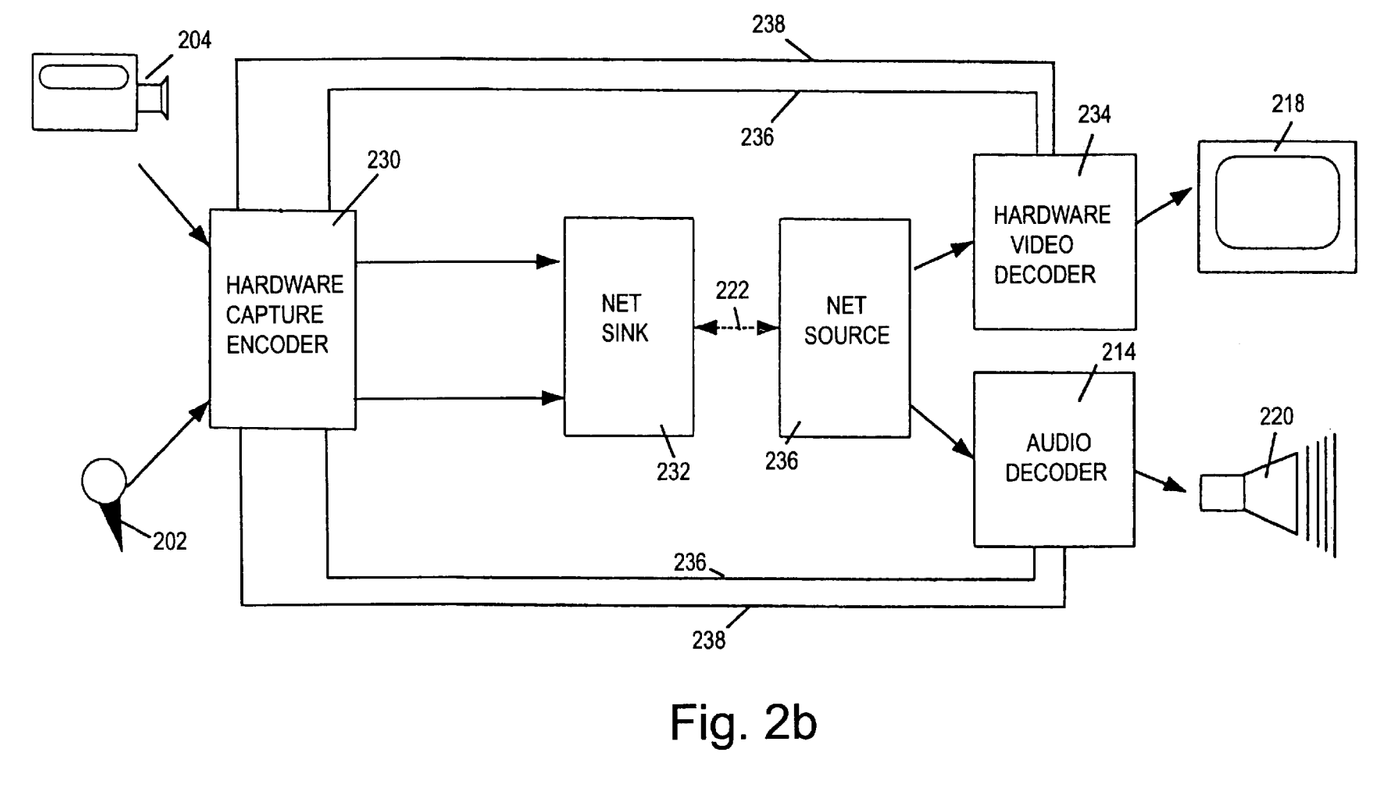
FIG. 2*b* is a block diagram schematically illustrating an architecture for audio and video capture, encoding, and decoding according to an embodiment of the invention.

In overview, to perform both the capture and encoding functions previously performed by separate modules found in the prior art, an embodiment of the invention utilizes a capture encoder module 230 embodied in hardware as illustrated in FIG. 2b. The output of the capture encoder module 230 is in a form appropriate for transmittal by the net sink 232, whereby the need for further processing is minimized. At the receiving endpoint, the video decoder module 234 is now incorporated in hardware that is adapted for receiving the encoded data from the net source 236, and outputting data ready for rendering. The audio decoder module 214 may be implemented in hardware or software.

To facilitate the dynamic modification of the capture functionality, both decoder modules are linked via a control channel 236 to the hardware capture encoder module 230. To this end, the decoder modules 214, 234 monitor status transmissions on a status channel 238, and may issue commands or indications over the control channel 236 to the capture encoder module 230 based upon what is observed. An additional benefit yielded by this architecture is derived from moving the computationally expensive audio encoding, video encoding, and video decoding functions typically performed by the host computer into the hardware capture encoder and decoder modules. Thus, the resources of the host computers at the sending and receiving endpoints may be devoted to other necessary tasks. The interfaces and properties usable to implement this improved architecture will now be discussed in greater detail.

Figure 3:
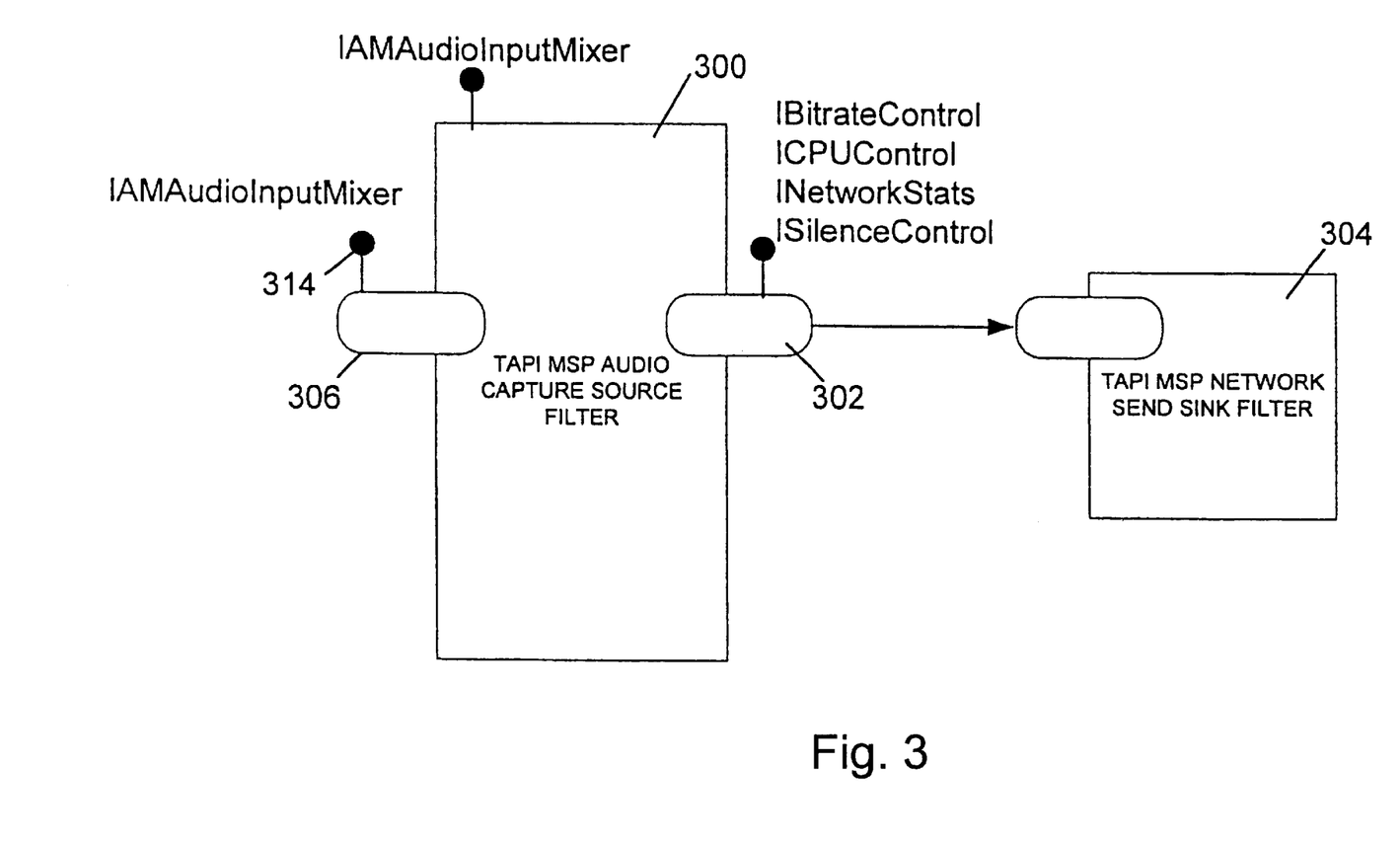
FIG. 3 is a diagram schematically illustrating a filter organization usable to direct audio capture and encoding in an embodiment of the invention.

As discussed with respect to FIG. 2a, the prior art audio teleconferencing architecture suffers from many disadvantages. With respect to audio teleconferencing in particular, to overcome some of these disadvantages, the subject invention utilizes audio encoding acceleration provided by vesting an audio capture hardware device with audio encoding functionality such that a separate software encoder module is not needed. A filter graph corresponding to this embodiment is illustrated in FIG. 3. The audio capture source filter 300 corresponding to a capture encoder hardware module supports a compressed audio output pin 302 which provides data in a form immediately usable by the network send sink filter 304, such as G.711, G.723.1, or G.729. The network send sink filter 304 subsequently fragments the encoded audio data into RTP packets for transmission over the network.

The audio capture filter 300, connected into the graph by TAPI 3.0, is in part an aggregation of the traditional DIRECTSHOW interfaces exposed by KSProxy. Additional interfaces which are unique to an audio acceleration architecture according to the invention may be implemented by the audio capture filter 300 using the generic IKsPropertySet interface exposed by KSProxy. Such interfaces include IBitrateControl, INetworkStats, ICPUControl, and ISilenceControl. In order to communicate H.245 FlowControl commands to the compressed audio output pin 302, the call control component 600 of TAPI illustrated in FIG. 6 uses the IBitrateControl interface. The network sink filter 304 uses the INetworkStats interface to inform the compressed audio output pin 302 of the transmission channel conditions. The ICPUControl interface at the output pin 302 may be used by a TAPI quality controller module associated with the MSP 608 to initialize and adjust the maximum encoding time per frame and CPU load with respect to the compression algorithm. The quality controller module may also use the IBitrateControl interface to initialize and regulate the outgoing bit rate of the compressed audio output pin 302.

So that the teleconferencing application may change the silence detection threshold level and obtain information regarding other functions, the ISilenceControl interface is preferably supported by the compressed audio output pin 302. Silence detection involves determining when an audio buffer contains entirely silence, or audio data whose acoustic energy falls below a given threshold, and sending no data under such circumstances. Alternatively, in the case of G.723 audio encoding, very small compressed silence packets may be sent under such circumstances. It is typically difficult to extract acoustic energy information from RTP encoded audio data, while PCM audio data allows ready access to such energy information. Therefore, a hardware device according to this embodiment of the invention preferably derives the acoustic energy internally from the PCM data, and is therefore able to adapt its silence detection, and accordingly its data output, in compliance with commands received at the ISilenceControl interface.

Audio acceleration hardware implemented in accordance with this embodiment of the invention preferably also provides analog inputs such as Mic and Line-In, represented on the audio capture source filter 300 as microphone bridge pin 306. This pin 306 preferably exposes the IAMAudioInput-Mixer DIRECTSHOW configuration interface for use by TAPI in controlling audio properties such as volume and mixing. Preferably, TAPI in turn exposes the interface to the client application. The IAMAudioInputMixer interface contains a set of methods preferably including: put_Enable (used to enable or disable an audio input in the mixed output), get_enable (used to determine if an audio input is enabled), put_Mono (used to combine all audio channels of an input into a mono audio signal), get_Mono (used to determine if all audio channels of an input are combined into a mono audio signal), put_MixLevel (used to set the record level of an audio input), get_MixLevel (used to retrieve the recording level of an audio input), put_Pan (used to set the pan value of an audio input), get_Pan (used to retrieve the pan value of an audio input), put_Loudness (used to enable or disable the loudness control of an audio input), get_Loudness (used to determine if the loudness control of an audio input is enabled), put_Treble (used to set the treble equalization for an audio input), get_Treble (used to retrieve the treble equalization for an audio input), get_TrebleRange (used to retrieve the treble range of an audio input), put_Bass (used to set the bass equalization for an audio input), get_Bass (used to retrieve the bass equalization for an audio input), and get_BassRange (used to retrieve the bass range for an audio input).

In order to provide control of the audio capture hardware by the remote endpoint, a number of commands may be utilized. These are preferably communicated via the H.245 control channel defined above, and include a "flowcontrol" command and a "mode request" procedure. The flowcontrol command allows the remote endpoint to control the bit rate of the audio stream as discussed above. This functionality allows the interworking of terminals that support only a finite number of bit rates, and allows the matching of the rates of information from different sources, and allows adaptation of the data flow to accommodate network congestion. The mode request procedures allow a remote terminal to request that the local terminal use a particular mode of operation. Whenever the TAPI MSP 608 receives a mode change request from a remote endpoint, a new format is set on the audio output pin 302 based on the content of the request. Audio acceleration hardware implemented in accordance with this embodiment of the invention preferably is adapted to accommodate such mode requests dynamically without pausing or stopping the audio stream.

In a manner similar to that described earlier with respect to prior audio transmission architecture, existing video transmission architecture also requires an encoding module external to the capture hardware to prepare the video data for transmission, as illustrated in FIG. 2a. This entails similar computational losses and inefficiencies with respect to the host computer. In order to overcome these and other shortcomings, a video acceleration architecture is described which provides for the inclusion within the capture hardware of an encoding module. This eliminates the need to provide an encoding module running on the host. Thus, computational resources of the host are released to perform other essential tasks. This enhanced capture device is vested with adaptive behavior via an intercommunication architecture with an associated decoder. The decoder preferably has incorporated into it functionality allowing it to analyze incoming data, and to communicate with the capture device via API's discussed herein. To facilitate the intercommunication architecture in an embodiment of the invention, the data field of the H.245 control channel is utilized.

Figure 4:
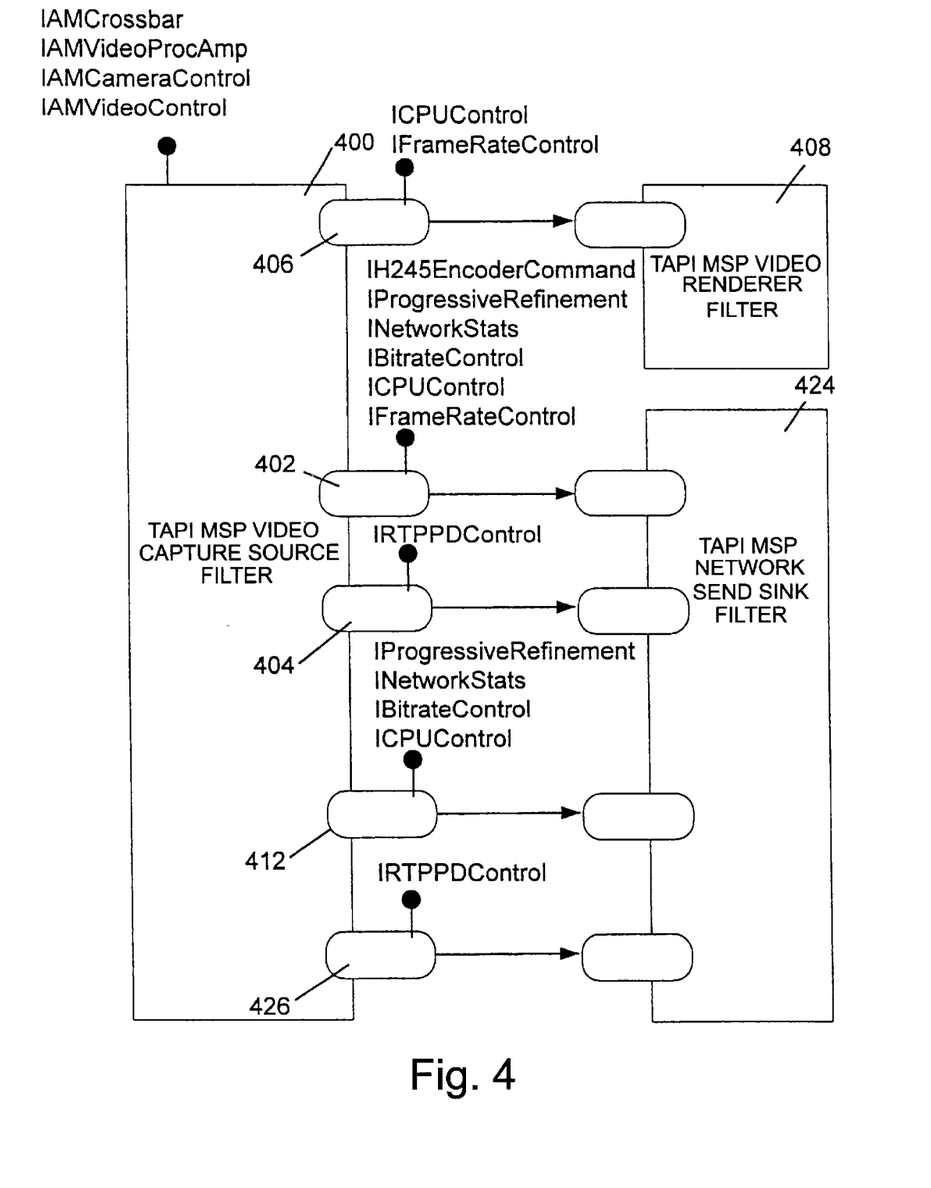
FIG. 4 is a diagram schematically illustrating a filter organization usable to direct video capture and encoding in an embodiment of the invention.

A filter graph corresponding to the video acceleration architecture of an embodiment of the present invention is illustrated schematically in FIG. 4. The video capture source filter 400 corresponding to a capture encoder hardware module preferably exposes two synchronized output pins 402, 404. One pin 402 preferably provides data in H.261, H.262, or H.263 format, while the other 404 preferably generates packetization descriptors to facilitate the RTP fragmentation. Placement of the packetization descriptor information on a separate pin allows adaptation to accommodate new video subformats by simply changing the packetization descriptor stream. Additionally, since packetization descriptor information is only useful when information is transmitted over a network, separating the compressed data from the packetization descriptor information allows for direct local use or storage of the compressed data without packet parsing.

In order to provide a local preview function, the video capture source filter 400 also preferably exposes a preview pin 406, usable by the host to locally render a version of the image to be transmitted. In particular, in order to facilitate this functionality the preview pin 406 may be linked in the graph to a video renderer sink filter 408, as illustrated. The preview pin 406 preferably provides non-compressed data which is displayed on the local screen using the DirectShow overlay mode or other suitable mechanism. If a preview stream is not provided by the hardware accelerator, preview images may alternatively be obtained by exposing a preview pin 406 on the video capture filter 400 which generates preview data derived directly from the encoded video data stream at pin 402. This alternative is preferable to simply duplicating the encoded video data stream within the hardware. Note that the frame rate at the preview pin 406 may be less than that at the video output pin 402.

Although the present embodiment of the invention is preferably utilized in conjunction with a digital video device such as a USB or IEEE 1394 camera, it may be used as well with an analog video device. In such an implementation, it is preferable that the video capture filter 400 expose an analog video data input stream representing input to a digitizer.

Video capture hardware according to this embodiment of the invention preferably supports an H.245 command property set to receive, from the remote endpoint, requests for I-frame, group of blocks, or macro-block updates due to packet loss or multipoint switching, as described below. As well, such hardware also preferably supports a progressive refinement mode, wherein an interface such as IProgressiveRefinement is exposed on the video output pin 402 to request transmission of high resolution still images that are progressively refined at the remote endpoint as more data is received and decompressed. Alternatively, this mode may be implemented on a separate dedicated output pin 412, or not at all.

In a similar manner to the earlier described audio acceleration architecture, existing DIRECTSHOW interfaces such as IAMCrossbar, IAMVideoProcAmp, IAMCameraControl, and IAMVideoControl are aggregated by the TAPI MSP video capture filter 400, while the compressed video output pin 402 interfaces which are specific to this embodiment such as IH245EncoderCommand, INetworkStats, IFrameRateControl, IBitrateControl, ICPUControl, and IProgressiveRefinement are implemented by the video capture filter 400 using the generic IKsPropertySet interface exposed by KSProxy. These interfaces are described in greater detail hereinafter.

To provide control of the video capture hardware by the remote endpoint, a number of H.245 control channel commands and indications may be utilized. In order to process such commands, the compressed video output pin 402 preferably exposes to the TAPI call control component 600 an IH245EncoderCommand interface containing the following methods: videoFastUpdatePicture (used to command the compressed video output pin 402 to enter a fast-update mode at the earliest opportunity), videoFastUpdateGOB (used to command the compressed video output pin 402 to perform a fast update of one or more groups of blocks (GOB's)), videoFastUpdateMB (used to command the compressed video output pin 402 to perform a fast update of one or more macroblocks (MBs)), videoSendSyncEveryGOB (used to command the compressed video output pin 402 to use sync for every GOB as defined in the H.263 recommendation), videoSendSyncEveryGOBCancel (used to command the compressed video output pin 402 to decide the frequency of GOB syncs), videoNotDecodeMBs (used to indicate to the compressed video output pin 402 that a set of MBs has been received with errors and that any MB in the specified set has been treated as not coded).

Note that many H.245 control commands and indications are communicated to the video output pin indirectly. For example, the FlowControl command, used by the remote endpoint to control the bit rate of the video stream, is propagated to the compressed video output pin via an intermediate method such as the IBitrateControl::SetMaxBitrate method. The videoTemporal/SpatialTradeOff command, used by the remote endpoint to indicate priorities regarding video quality versus frame rate, is communicated via the H.245 channel to TAPI which adjusts the frame rate if necessary using a method such as the IFrameRateControl::SetMaxFrameRate method. H.245 Mode Requests are also sent to TAPI, which sets the format on the compressed video output pins 402, 412 as indicated in the request.

Furthermore, the INetworkStats, ICPUControl, and IBitrateControl interfaces may function in a manner similar to the analogous functions defined above with respect to audio encoding. For example, to communicate the network channel characteristics from the network sink filter 424 to the compressed video pin 402, the INetworkStats interface may be used. The ICPUControl interface is used to provide to the video output pin 402 the maximum allowable encoding time and CPU load that may be attained during compression. The IBitrateControl interface is used to specify a maximum bit rate for data output at the video output pin 402.

In order to specify a target frame rate to the compressed video output pin 402, the IFrameRateControl interface is used at the outset of a call, and periodically throughout the call. Initial and limit values for the target frame rate are preferably based on user-defined settings and on negotiations between the call endpoints. Finally, to allow for the request of transmission of high-resolution still images that are continuously improved at the remote endpoint as additional data is received and decompressed, TAPI may use the IProgressiveRefinement interface to process H.245 progressive refinement commands.

The preview output pin 406, if utilized, also preferably supports two interfaces for use by the TAPI MSP 608 quality control component. These interfaces, ICPUControl and IFrameRateControl, serve functions analogous to the corresponding interfaces on the video output pin 402, and may be similarly implemented by calling the IKsPropertySet methods exposed by KSProxy on the preview video output stream.

The separate compressed still image pin 412, if utilized, also preferably supports the interfaces IProgressiveRefinement, INetworkStats, ICPUControl, and IBitrateControl. In particular, the TAPI call control component preferably uses the IProgressiveRefinement interface to communicate progressive refinement H.245 commands to this pin 412, while the network sink filter 424 uses the INetworkStats interface to inform the pin 412 of network channel conditions. The TAPI quality control component uses the ICPUControl interface as described above to initialize and adjust the maximum allowable encoding time and CPU load. The IBitrateControl interface, also used by the TAPI quality control component, is operable to initialize and adjust the outgoing bit rate at this pin 412.

Many networks limit the transmittable packet size to a maximum transmission unit (MTU). Accordingly, in order to avoid packet fragmentation and associated delay, it is preferable to set maximum packet size for the RTP packetization descriptor at or below the MTU for the network of interest. In order to allow the network filter 424 to dynamically adjust the maximum RTP packet size, TAPI is preferably able to interface with the packetization descriptor pin 404 via an IRTPPDControl interface using SetMaxRTPPacketSize and GetMaxRTPPacketSize methods. Because the IRTPPDControl interface is not a standard DIRECTSHOW interface, the video capture filter 400 preferably implements this interface by calling IKsPropertySet methods exposed by KSProxy on the RTP packetization descriptor output stream of the video capture hardware.

If the compressed still image pin 412 is provided, it is preferable to also provide an RTP packetization descriptor pin 426 associated with the compressed still image pin 412. The RTP packetization descriptor pin 426 for the compressed still image pin 412 is preferably interfaced in the same manner as the RTP packetization descriptor pin 404 associated with the video output pin 402, using IRTPPDControl.

According to a preferred embodiment of the invention, the audio and video encoding architectures described above are implemented in a single hardware device. The encoding of data causes some finite delay, and the delay associated with encoding audio data is likely to differ from the delay associated with encoding video data. The placement of both encoders into one hardware device facilitates rapid measurement of these delays, and synchronization of the transmitted signals, so that the delay for both data types appears to be the same.

During a teleconference, the video output of the aforementioned encoding architectures traverses some communications medium, such as the Internet, a LAN, or some combination of networks, and is received at a decoding endpoint. In a typical video decoding and rendering architecture, a separate software decoder module runs on the host computer, and is used typically to decompress or decode the incoming video data so that it may be rendered. The video decoder module typically does not have functionality for analyzing incoming data packets. Rather, the typical decoder simply receives RTP encoded data as input, and returns RGB data as output. As a result, the typical decoder will not, for example, detect that a video frame is missing, incomplete, or inaccurate, and will generally also be unable request an adaptation of the transmission rate or the degree of compression when transmission conditions change.

Figure 5A:
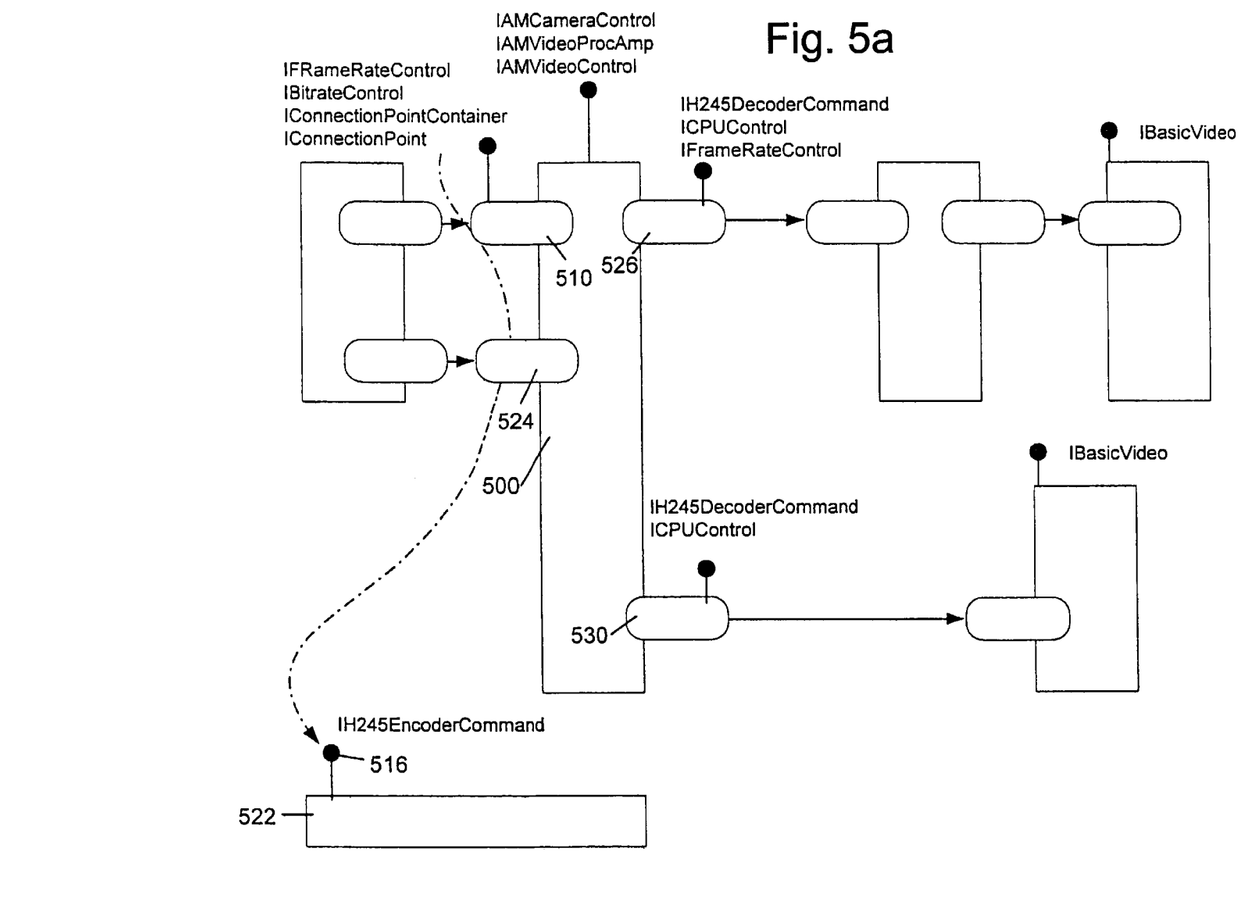
FIG. 5*a* is a diagram schematically illustrating a filter organization usable to direct video decoding in an embodiment of the invention.
Figure 5B:
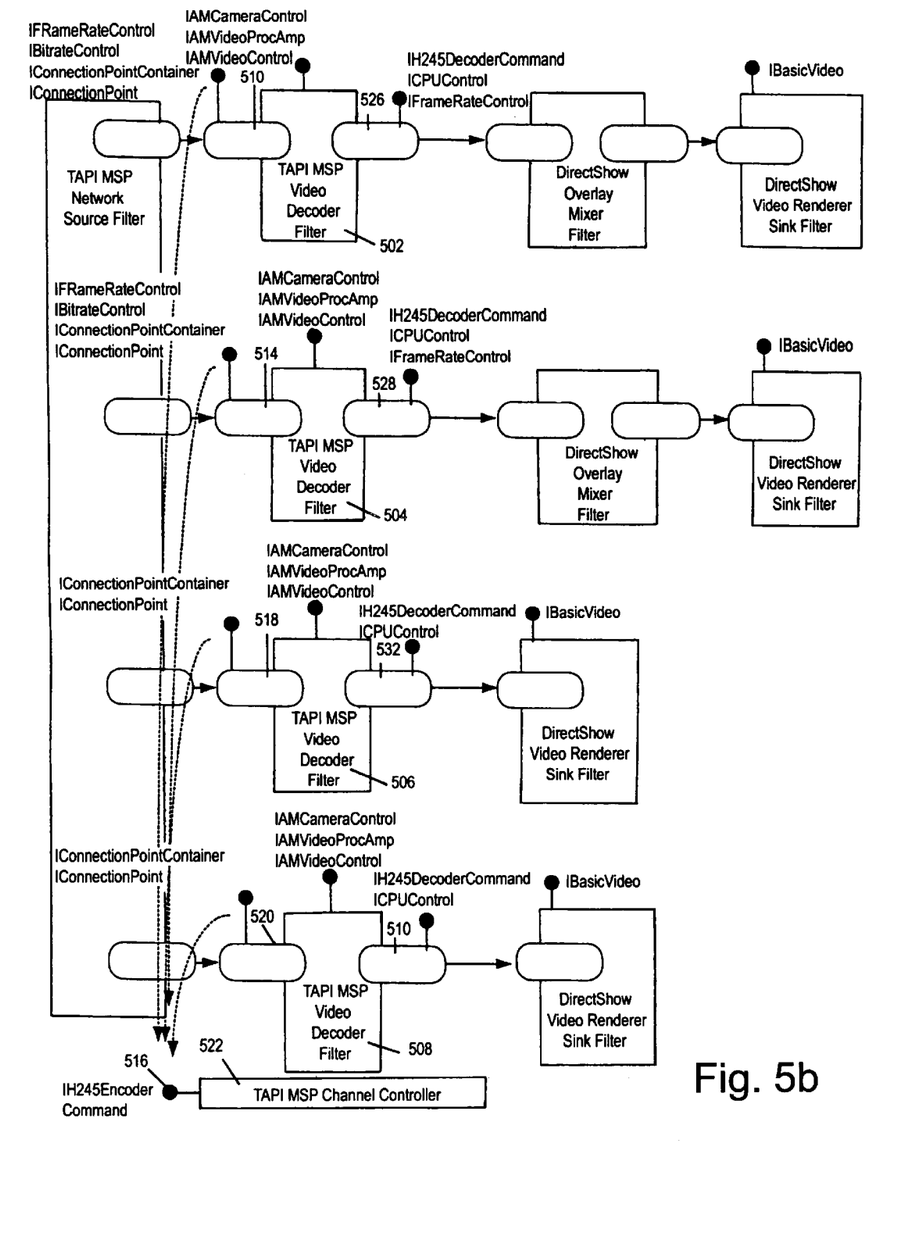
FIG. 5*b* is a diagram schematically illustrating a filter organization usable to direct video decoding in an alternative embodiment of the invention during a multipoint call.

In accordance with an embodiment of the invention, a video acceleration architecture is described having a receiving endpoint which includes a decoding module within a hardware video processing device, eliminating the need to provide a software decoding module running on the host. Thus, computational resources of the host are released to perform other essential tasks. This enhanced video decoding architecture is preferably able to monitor received data, and to relay responsive commands and indications to the video capture architecture via the H.245 control channel. A filter graph corresponding to the receiving end of a two party video teleconference implemented in accordance with this embodiment of the invention is illustrated in FIG. 5a. The invention may also be utilized in the context of a multiparty conference, as depicted in FIG. 5b. Where there are two or more remote sending parties, it is preferable that decoder modules for each sending party are implemented in hardware. Nevertheless, a hardware decoding architecture according to the invention may have a decoder in hardware for one sending party, with decoders for the remaining parties implemented as software decoder modules running on the receiving host. The filter graph for an embodiment wherein all decoders are implemented in a single hardware decoder would preferably contain only one decoder filter, representative of the hardware decoder, with input and output pins corresponding to the various data streams.

As described above with respect to audio and video encoding, TAPI is preferably utilized in conjunction with DIRECTSHOW and the Windows Driver Model to provide access to data streams and control channels for the hardware video decoder accelerator according to this embodiment of the invention. A hardware accelerator according to the invention preferably supports existing local control interfaces such as the DIRECTSHOW interfaces IAMVideoProcAmp, IAMCameraControl, and IAMVideoControl, which TAPI may expose to a local teleconferencing client application. These interfaces are usable to implement local functionality such as modification of video quality settings, simulation of local camera control capability, or local manipulation of the picture orientation, respectively.

In order to allow the retrieval of information on the bit rate and frame rate respectively of the incoming RTP-packetized video data, the TAPI MSP video decoder filters 500, 502, 504, corresponding to video decoder hardware modules, preferably expose the interfaces IBitrateControl and IFrameRateControl, supported by the compressed video input pins 510, 514, to the TAPI MSP 608 quality control component or to the teleconferencing application itself. Because these interfaces are not directly available on KSProxy, the video decoder filters preferably implement these interfaces by calling the IKsControl interface methods exposed by KSProxy on the accelerator compressed video input stream.

In order to send and receive the H.245 commands and indications described earlier with respect to the video encoder architecture, a TAPI MSP channel controller 522 may expose the IH245EncoderCommand interface to the RTP-packetized input pin 510, 514 of the TAPI MSP video decoder filters 500, 502, 504. This pin may then call on this interface to send H.245 commands such as requests for I-frame, GOB, or MB updates to the remote sending point, as discussed earlier. Given that it is not currently feasible for a Stream class minidriver to make calls on a user-mode outgoing interface, it is preferable to define an event set such as KSEVENTSETID_H245COMMAND, usable to signal the TAPI MSP video decoder filter RTP-packetized input pin that it needs to make a call to the IH245EncoderCommand interface on a stream basis.

The methods contained in the IH245EncoderCommand interface are those described earlier with respect to the compressed video output pin 402 of the encoder architecture. Also as described, the actual flowcontrol command is not issued by the decoding accelerator, but rather is issued by the TAPI MSP through the channel controller 522 whenever the TAPI MSP 608 quality control module or the application request a flow control operation. Similarly, the videoTemporal/SpatialTradeOff command is issued by the channel controller 522 whenever the application requests a change in the temporal/spatial trade-off, in order to receive higher or lower resolution images in exchange for lower or higher frame rates. Any H.245 mode requests also are not handled directly by the decoding accelerator, but by the TAPI MSP through the channel controller 522. Such requests allow the teleconferencing application at the receiving endpoint to request a mode change of the sending endpoint.

An RTP-packetized compressed still image input pin 524, 518, 520 may be provided on the decoder filter. If such a pin is provided, it preferably is enabled to use the H.245 control channel through the IH245EncoderCommand interface in the same manner and to the same extent as described above with respect to the RTP-packetized compressed video input pin.

In order to communicate decoder commands to the uncompressed video output pin 526, 528 and still image output pins 530, 532, 534, these pins preferably support the interface IH245DecoderCommand. This interface is usable by the TAPI MSP channel controller 522 to communicate H.245 decoder commands to the pins. Such commands may include picture freeze or picture release commands.

The optional ICPUControl interface may be supported by any of these output pins, and is usable by the TAPI MSP 608 quality control module to initialize and adjust the maximum decoding time per frame, as well as the CPU load not to be exceeded by the decoder's decompression algorithm. The video output pin 526 preferably supports the IFrameRateControl interface, usable by the TAPI MSP 608 quality controller to initialize and adjust the target frame rates throughout a call. These three interfaces are not standard DIRECTSHOW interfaces and thus are preferably implemented by the video decoder filters 500, 502, 504, 506, 508 by calling the IKsControl interface methods exposed by KSProxy on the uncompressed video output streams or the IKsPropertySet interface methods exposed by KSProxy on the uncompressed still image output streams, as appropriate.

All of the references cited herein, including publications, are hereby incorporated in their entireties by reference.

An accelerated end-to-end network encoding and decoding architecture has been described with reference to specific embodiments. However, in view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that certain of the elements of the illustrated embodiments shown in software may be implemented in hardware and vice versa or that the illustrated embodiments can be modified in arrangement and detail without departing from the spirit of the invention.

Additionally, although the invention has been described by reference to TAPI 3.0, DIRECTSHOW, and the Windows Driver Model, the invention is not limited to such an implementation. Therefore, the invention as described herein contemplates all such embodiments as may come within the scope of the following claims and equivalents thereof.

We claim:

1. A teleconferencing accelerator apparatus for transmitting data via a packet-switched network, comprising:
   a capture encoder hardware module for capturing and encoding video image and audio data comprising:
   a video input operable to receive video image data;
   a video output operable to supply encoded video image data in a format transmittable via the packet-switched network;
   an audio input operable to receive audio data;
   an audio output operable to supply encoded audio data in a format transmittable via the packet-switched network; and
   a control input for receiving requests from a video decoder or audio decoder to modify in real-time the data encoding and capture functionality of the module.

2. The apparatus according to claim 1, wherein the capture encoder hardware module further comprises a packetization descriptor output operable to supply a description of the intended packetization of the encoded video image data for transmittal over the packet-switched network.

3. The apparatus according to claim 2, further comprising a video decoder hardware module adapted to receive video data packets from the capture encoder hardware module, analyze the received packets, and decode the encoded video image data, comprising:
   a packetized encoded video image data input operable to receive the packetized encoded video image from the packet-switched network; and
   an unencoded video image data output, operable to supply unencoded video image data.

4. The apparatus according to claim 3, wherein the request is selected from the group consisting of:
   a command to enter a fast-update mode;
   a command to perform a fast update of a group of blocks;
   a command to perform a fast update of a macroblock;
   a command to use sync for every group of blocks;
   a command to decide the frequency of group of block syncs;
   an indication that a set of macroblocks has been received with errors and has been treated as not coded;
   a command to enter a progressive refinement mode;
   a command to alter the maximum bit rate; and
   a command to alter the maximum frame rate.

5. The apparatus according to claim 4, wherein the capture encoder hardware module further comprises a separate progressive refinement output operable to supply progressive refinement data.

6. The apparatus according to claim 2, further comprising:
   a video decoder hardware module adapted to receive the packets, analyze the received packets, and decode the encoded video image data, comprising:
   a packetized encoded video image data input operable to receive the packetized encoded video image data from a network; and
   an unencoded video image data output, operable to supply unencoded video image data; and an audio decoder module adapted to receive the encoded audio data, to analyze the received data, and to decode the encoded audio data, comprising:
an encoded audio input; and
an audio output operable to supply unencoded audio data.

7. The apparatus according to claim 1, wherein the encoded video image data conforms to an ITU-T H.323 standard for video data transmission.

8. The apparatus according to claim 1, wherein the capture encoder hardware module further comprises a preview output operable to supply preview data to be displayed on a local display device.

9. The apparatus according to claim 1, wherein the video image data received by the video input is digital.

10. The apparatus according to claim 1, wherein the video image data received by the video input is analog.

11. The apparatus according to claim 1, wherein the encoded audio data conforms to an ITU-T H.323 standard for transmission of audio data.

12. The apparatus according to claim 1, further comprising an audio decoder module having an encoded audio input operable to receive the encoded audio data, and an audio output operable to supply unencoded audio data.

13. The apparatus according to claim 1, wherein the capture encoder hardware module is adapted to measure the acoustic energy of the audio data prior to encoding the audio data to detect silent input.

* * * * *